United States Patent
Argue et al.

(10) Patent No.: US 9,324,106 B2
(45) Date of Patent: Apr. 26, 2016

(54) IN-STORE NAVIGATION WITHOUT ELECTRONIC POSITIONING

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/473,757

(22) Filed: Aug. 29, 2014

(65) Prior Publication Data

US 2016/0063609 A1    Mar. 3, 2016

(51) Int. Cl.
*G06K 15/00*   (2006.01)
*G06Q 30/06*   (2012.01)
*G06Q 20/20*   (2012.01)

(52) U.S. Cl.
CPC ............ *G06Q 30/0639* (2013.01); *G06Q 20/20* (2013.01); *G06Q 30/0633* (2013.01)

(58) Field of Classification Search
CPC ... G07F 19/20; G07F 7/1008; G06Q 20/1085; G06Q 20/341; G06Q 30/06; G06Q 20/20; G06K 7/10881; G06K 7/10851
USPC .............................. 235/383, 472.01, 380, 379
See application file for complete search history.

(56) References Cited

U.S. PATENT DOCUMENTS

| | | | |
|---|---|---|---|
| 6,123,259 A | 9/2000 | Ogasawara | |
| 6,587,835 B1 | 7/2003 | Treyz | |
| 7,147,154 B2 | 12/2006 | Myers | |
| 7,309,009 B2 | 12/2007 | Singer-Harter | |
| 7,734,507 B2 | 6/2010 | Ritter | |
| 8,254,881 B2 * | 8/2012 | Shaw .................. | G06Q 20/102 235/379 |
| 2002/0065714 A1 | 5/2002 | Goodwin | |
| 2002/0178013 A1 | 11/2002 | Hoffman | |
| 2006/0059049 A1 | 3/2006 | Morris | |
| 2008/0249870 A1 | 10/2008 | Angell | |
| 2009/0319182 A1 | 12/2009 | Monteverde | |
| 2012/0259732 A1 | 10/2012 | Sasankan | |
| 2012/0277991 A1 | 11/2012 | Wagner | |
| 2013/0030915 A1 | 1/2013 | Statler | |
| 2013/0332273 A1 | 12/2013 | Gu | |
| 2013/0346204 A1 | 12/2013 | Wissner-Gross | |

* cited by examiner

*Primary Examiner* — Karl D Frech
(74) *Attorney, Agent, or Firm* — Howard & Howard Attorneys PLLC

(57) ABSTRACT

A shopping list is received from the user and locations of items in the list are obtained. A route visiting the locations of the items is generated and a corresponding ordering of items is also generated. Directions to a next item in the shopping list are provided in response to detecting checking off or scanning of a previous item. In response to detecting scanning of an item out of order or an item not in the shopping list, a new route is generated originated at the item and passing by the locations of items of the shopping list that have not been checked off or scanned. Routes may be generated according to a route optimization algorithm. The directions to items in a list may be provided on a user's mobile device without use of an electronic locating means such as GPS, beacons, or the like.

16 Claims, 6 Drawing Sheets

IN-STORE NAVIGATION WITHOUT ELECTRONIC POSITIONING

BACKGROUND

1. Field of the Invention

This invention relates to systems and methods for providing in-store directions to shoppers.

2. Background of the Invention

The global positioning system (GPS) has been widely used to provide turn-by-turn directions to drivers. Some attempts have been made to use GPS to provide similar turn-by-turn directions in a shopping environment. However, such attempts have been ineffective due to one or both of limited reception in a store and the limited accuracy of GPS receivers on the scale needed to locate items in a store. Other approaches such as RFID or BLUETOOTH beacons have also been used, but likewise lack the needed accuracy.

The systems and methods described herein provide an improved approach for providing in-store directions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
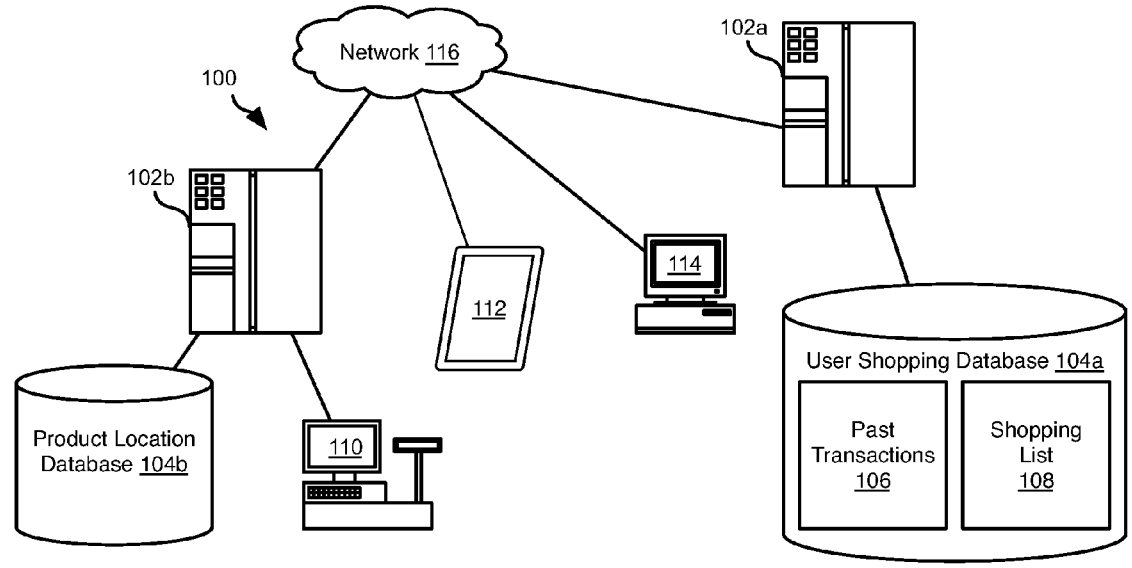
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. A shopping list is received from the user and locations of items in the list are obtained. A route visiting the locations of the items is generated and a corresponding ordering of items is also generated. Directions to a next item in the shopping list are provided in response to detecting checking off or scanning of a previous item. In response to detecting scanning of an item out of order or an item not in the shopping list, a new route is generated originated at the item and passing by the locations of items of the shopping list that have not been checked off or scanned.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 in which the systems and methods disclosed herein may be implemented. For example, a server system 102a may host a user shopping database 104a that stores data in user accounts for a plurality of users. A user account may store such information as records of past transactions 106 by a user and one or more shopping lists 108 of the user. A record of a past transaction 106 may include a list of items purchased in the transaction, the prices paid, the store where the transaction occurred, an identifier of a point of sale (POS) 110 at which payment was made, a time and date, and/or other information. In some embodiments, the transaction record may also list an order in which items were scanned or otherwise input to the POS 110. A shopping list 108 may be a list of items selected by the user and transmitted to the server system 102a, which then stores the list in the account of the user. For example, a user may input a shopping list by means of a mobile computing device 112 such as a mobile phone, tablet computer, wearable computer, or some other computing device. A user may also input a shopping list by means of a computer 114 such as a laptop or desktop computer. A shopping list 108 may be input by navigating an interface to a product catalog on a device 112, 114, the interface being generated by the server system 102a with reference to a product database.

A retail establishment may be associated with a server system 102b that receives records of transactions from one or more POSs 110 located at the retail establishment. The server system 102b may host or access a product location database 104b that maps products to locations in the floor plan of the store. Alternatively, the product location database 104b may be hosted or accessed by the server system 102a. A product location database 104b may map a product identifier to a location in the retail establishment. For example, a product identifier may be mapped to a shelf identifier and a shelf identifier may be mapped to a physical location in the retail establishment, e.g. in the form of globally defined coordinates or with respect to some local datum point in the retail establishment.

Although the methods disclosed herein are described as being performed on behalf of a user on one or both of the server systems 102a, 102b, in some embodiments, data for performing the disclosed methods may be provided to a computing device 112, 114, which then performs some or all of the steps of the disclosed methods.

The server systems 102a, 102b and computing devices 112, 114 may communicate with one another by means of a network 116, such as a local area network (LAN), wide area network (WAN), the Internet, or some other network. The data connection between the server systems 102a, 102b and computing devices 112, 114 may include any wired or wireless protocol.

Figure 2A:
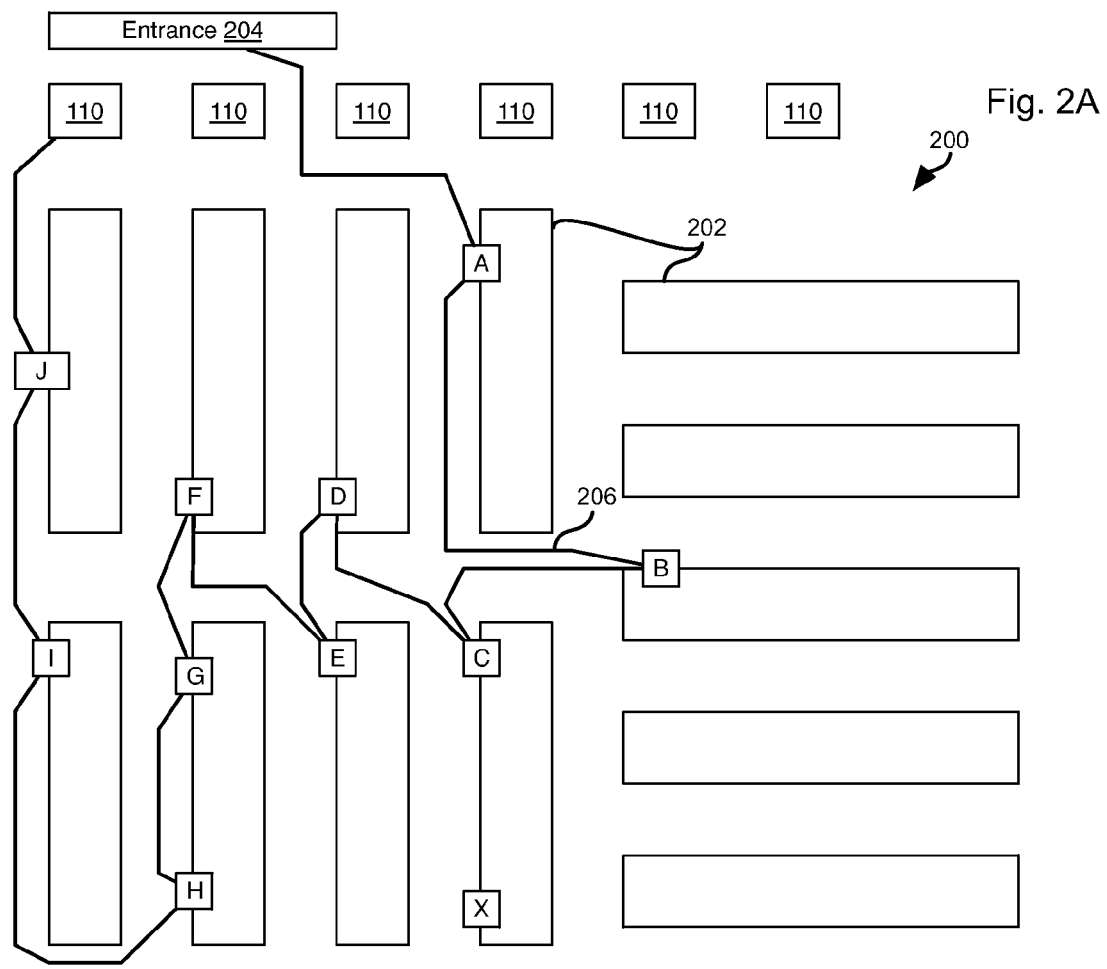
FIG. 2A is a schematic diagram of a retail environment including a route for retrieving a shopping list in accordance with an embodiment of the present invention.

FIG. 2A illustrates a floor plan 200 of a retail establishment. The floor plan 200 may include shelving 202 and other displays or structures for storing goods. The locations of the shelving 202 and other displays or structures may be included in an electronic representation floor plan. The floor plan 200 may include one or more POS 110 locations and locations of one or more entrances 204 to the retail establishment. Again, the position of the entrance 204 and the POS stations 108 may be in an electronic representation of the floor plan 200.

A shopping list may include a plurality of items A through J as shown in FIG. 2. A route 206 may be generated that visits the location of the items A through J in the illustrated ordering. The route 206 may be generated according to a route optimization problem, i.e. any algorithm for efficiently solving the "traveling salesman" problem by which the shortest route visiting a number of locations is determined or approximately determined. The route 206 may be relatively shorter than other possible paths but need not be the shortest of all possible paths. One or more other criteria may also be used to select the route 206 from among possible routes. For example, routes maybe scored according to length (longer routes given lower scores), complexity (more complex routes given lower scores), amount of doubling back required (the more doubling back required the lower the score). A route with the highest score may be selected as the route 206. Alternatively scores may increase with increasing, length, amount of doubling back, and complexity, such that the lowest scoring path is selected as the route 206. As shown in FIG. 2A, the path 204 may begin at an entrance 204 and terminate at a POS 110 or area of the store in which POSs 110 are located.

In operation, a shopping list ordered according to the route 204 may be displayed on a mobile device 204. For example, the next item on the list maybe displayed with direction to the location of the next item form the previous item or an entrance on a mobile device 112. The interface may include interface for receiving checking off of items, i.e. a user may indicate that an item has been retrieved. In response to receiving checking off of an item, directions to the next item may be displayed with an interface element for receiving checking off thereof. In some embodiments, the route is transmitted to the mobile device 112, such as display of directions to a next item may be retrieved from memory of the mobile device 112.

In some embodiments, a user may scan (e.g. photograph) an optical code or other portion of a product or label of a product using a camera of the mobile device 112. In response to detecting scanning of the optical code, the item may be determined on the mobile device to have been checked off and directions to a next item in the shopping list may be presented.

Figure 2B:
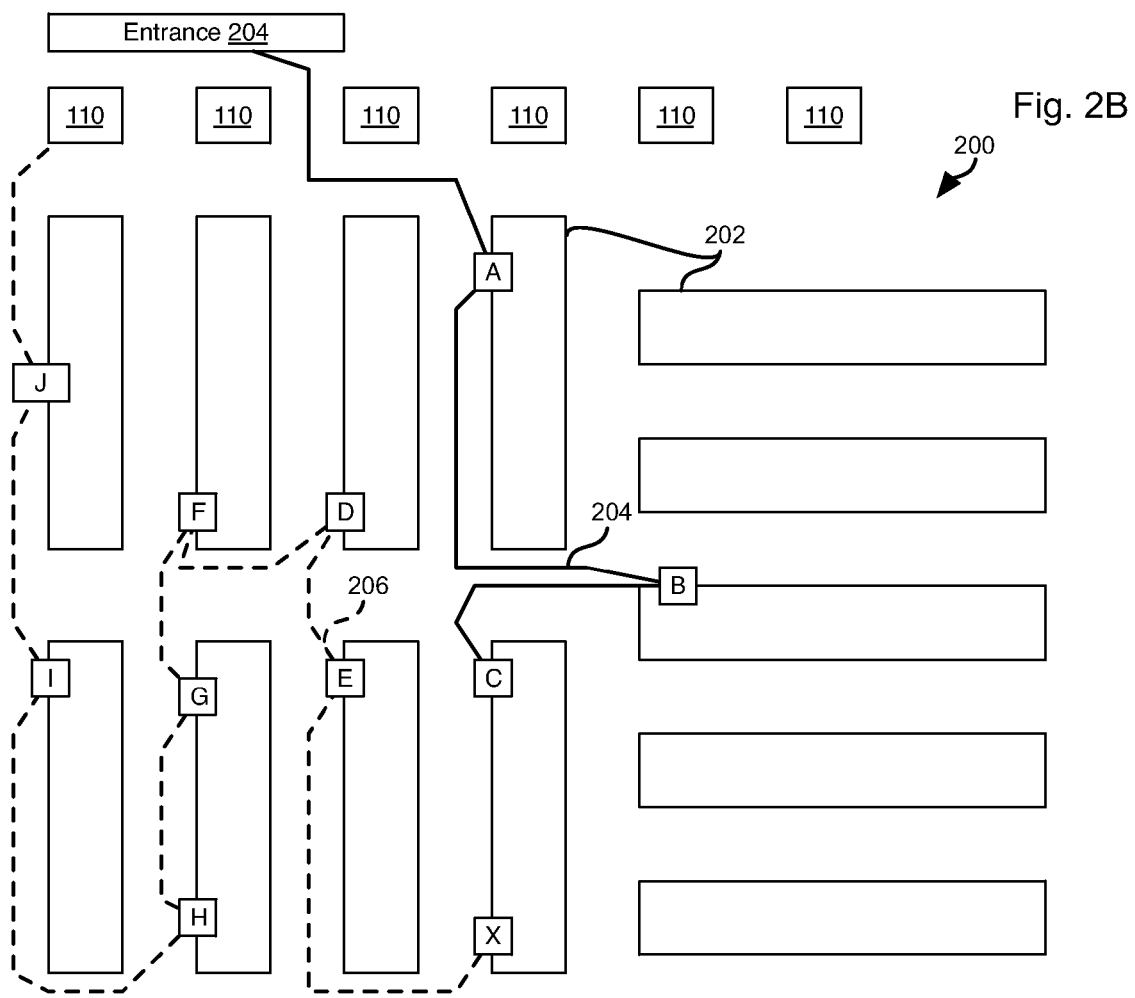
FIG. 2B is a schematic block diagram of the retail environment having an updated shopping list route according to checking off of an item in accordance with an embodiment of the present invention.

Referring to FIG. 2B, in some instances a user may check off or scan an item on the mobile device 112 that is either not on the shopping list used to generate the route 204 or is scanned out of order. For example, item X of FIG. 2A may be scanned. In response, an updated route 206 may be calculated that originates at item X and visits the locations of items of the shopping list that have not been checked off or scanned. For example, notification of scanning or checking off of item X may be transmitted by the mobile device 112 to the server system 102a or 102b, which then infers the user location to be the location of item X in the floor plan 200. A route may then be determined that visits items of the shopping list that haven't been checked off or scanned by the user. In this manner, GPS or other electronic positioning of the mobile device 112 is not required in order to infer the location of the user and provide adaptive directions to the customer.

Figure 3:
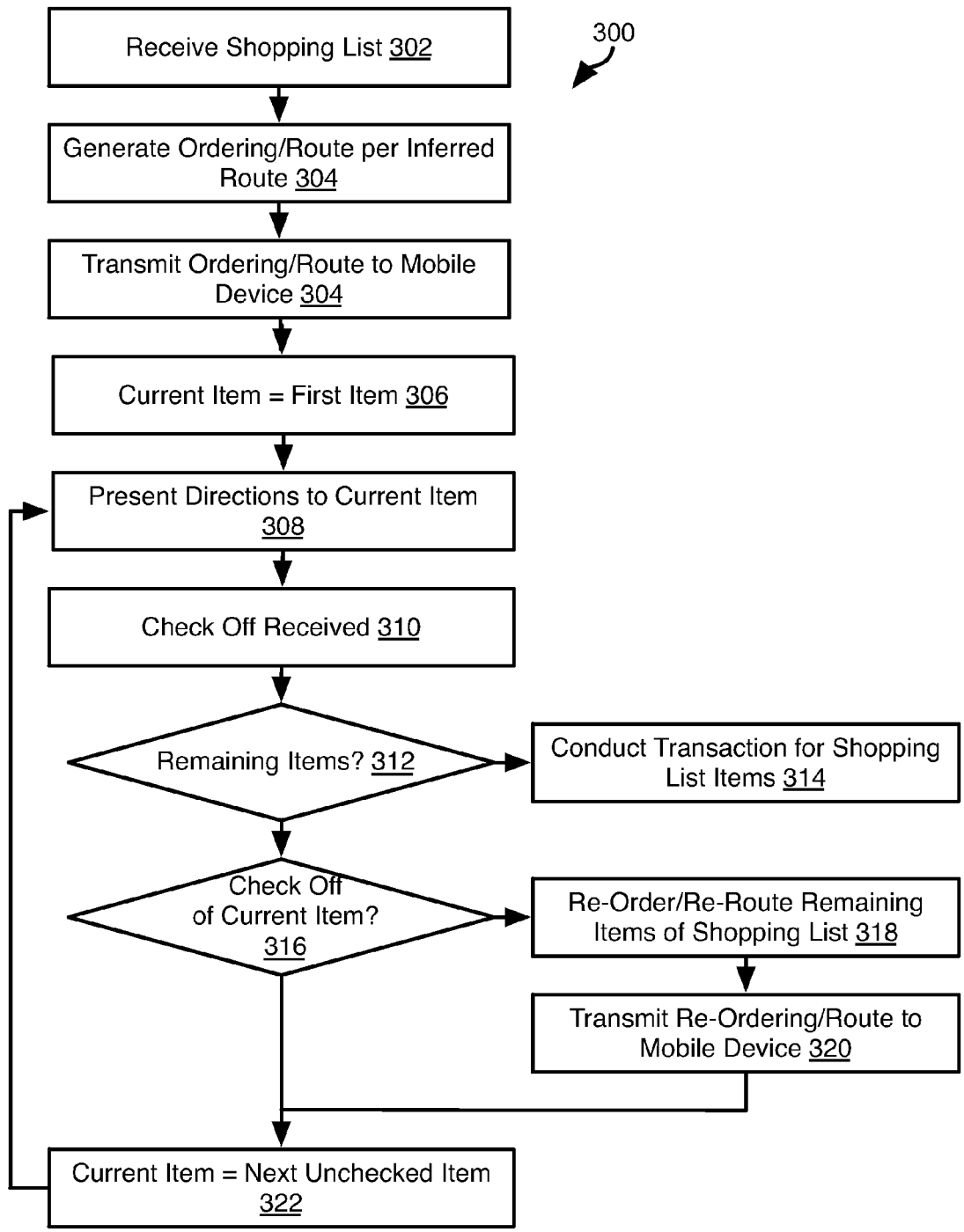
FIG. 3 is a process flow diagram of a method for providing in-store directions in accordance with an embodiment of the present invention.

Referring to FIG. 3, a method 300 may be used to provide adaptive guidance to a customer without requiring use of any electronic locating means of location such as beacons, GPS, or some other locating means. The method 300 may be executed on a server system 102a or 102b with inputs received from a mobile device 112 and outputs being transmitted to the mobile device 112 and displayed thereon.

The method 300 may include receiving 302 a shopping list from a user device, which may be the mobile device 112 of a customer or some other device 114. The shopping list may be received, for example, by receiving selections of items in a web interface to a product catalog presented on a device 112, 114 and added to an account of the user associated with the devices 112, 114. The shopping list may be stored as a list of item identifiers.

The method 300 may include generating 304 an ordering of the items of the shopping list and a route that visits the locations of the items of the shopping list in an order according to the ordering. In particular, locations of the items of the shopping list may be retrieved and a route visiting these locations may be determined, such as in the manner described above with respect to FIGS. 2A and 2B.

The ordering and route may be transmitted 304 to the mobile device 112 of the user. The ordering and route may include the ordered list of item identifiers of the shopping list and may include turn-by turn directions along the floor plan 200 of the retail establishment from a starting point such as an entrance 204 and from one item of the list to the next. Alternatively, data sufficient to enable the mobile device 112 to generate turn-by-turn directions may be transmitted to the mobile device 112. The route and ordering generated at step 304 may be understood to be an initial route and ordering and may further be used as a current route and ordering unless and until changed as described below.

The mobile device 112 may then display guidance to items of the shopping list in the order specified and along the route. For example, an identifier of a current item in the list may be presented along with directions to the current item from one of the previous item checked off or scanned on the mobile device 112 and an entrance or other starting point.

The method 300 may therefore include selecting 306 on the mobile device 110 and/or a server system 102a, 102b a first item in the ordering of the shopping list as the current item. And one or both of directions to the current item and an identifier of the current item may be presented 308 on the mobile device 112.

The method 300 may include receiving 310 scanning or check off of an item. A notification of scanning or check off of the item at step 310 may be transmitted to the server system 102a, 102b. Step 310 may include a user tapping or selecting an item of the list displayed on the mobile device 112 as an indication that the item on the list has been retrieved. Alternatively or additionally, an item of the list or some other item may be scanned (e.g. a bar code or other portion of a label photographed) by the mobile device and an identifier of the scanned item may be obtained.

If no items are found 312 to remain that are not checked off or scanned, then a transaction may be conducted 314 for items checked off or scanned. Step 314 may include transmitting by the server system 102a, 102b to the mobile device 112 directions to a POS 110 or areas of POSs 110. Conducting 314 a transaction may include conducting the transaction in a conventional manner, i.e. by scanning each item retrieved by a user at a POS and receiving tender of payment. Alternatively, conducting 314 the transaction may include performing a self-checkout method, such as that described with respect to FIG. 4, below.

If one or more items of the shopping list are found 312 not to have been checked off or scanned, the method 300 may include determining 316 whether the checked off or scanned item is the current item. If not, the method 300 may include re-ordering the remaining items of the shopping list and generating a route visiting the locations of the remaining items of the shopping list in the floor plan 200 of the store, the new route starting at the location of the item checked off or scanned at step 310. The re-ordering and new route may be transmitted 320 to the mobile device 320. The first item in the re-ordered list may be set 322 to be the current item, the re-ordered list may be set to be the current list and the method 300 may continue at step 308 with respect to the current item and current list.

If the item checked off or scanned at step 310 is found 316 to be the current item, then the item in the current list following the current item may be set 322 to be the current item and processing may continue at step 308.

Figure 4:
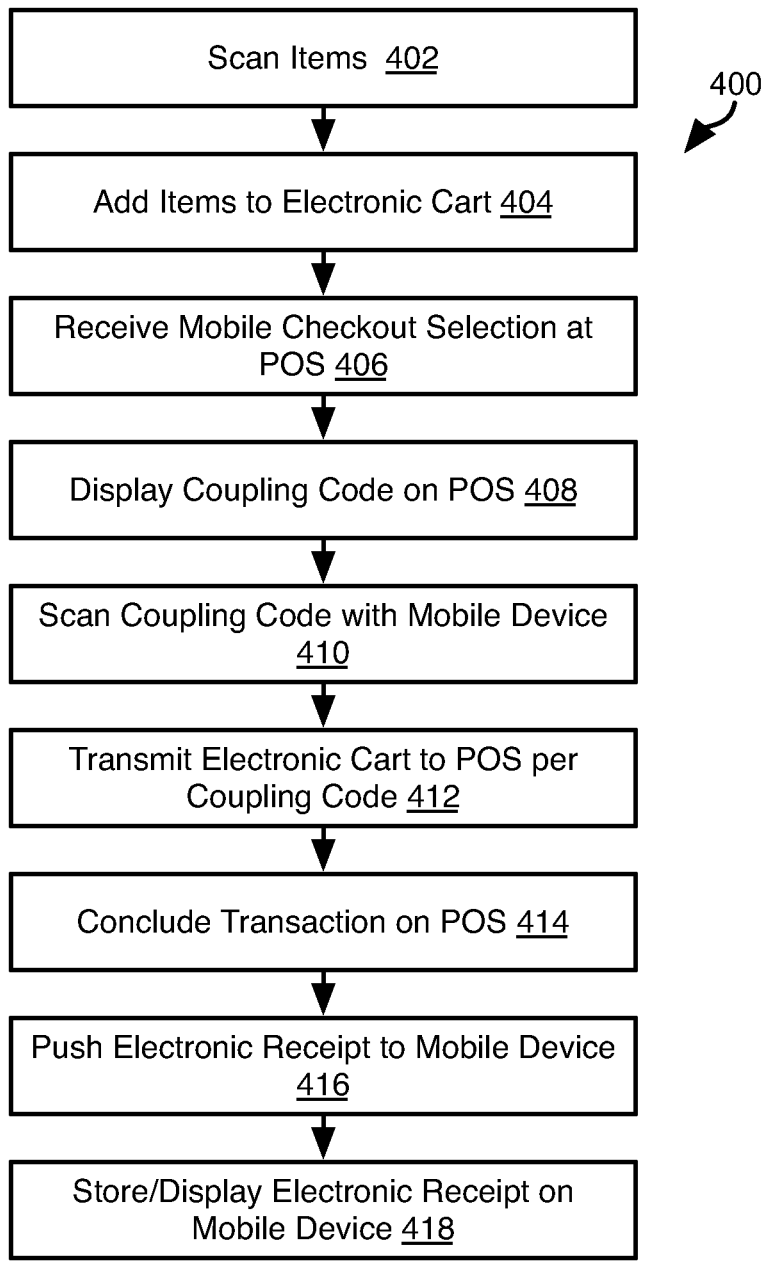
FIG. 4 is a process flow diagram of a method for performing mobile self-checkout in accordance with an embodiment of the present invention.

FIG. 4 illustrates an example method 400 for conducting an in-store transaction using an electronic shopping cart assembled by scanning items of a shopping list as described hereinabove. In conventional ecommerce transactions, an electronic shopping cart is assembled online, electronic payment is processed, and then shipping of the purchased products is authorized. In the illustrated method 400, an electronic shopping cart is populated by scanning items in a store with the mobile device 112 as described above.

In the illustrated method 400, items are scanned 402 and added 404 to an electronic shopping cart, such as according to the methods described hereinabove. At a POS 110, a request may be received 406 to use mobile self checkout (MSCO). This may be communicated verbally to a cashier who then inputs or otherwise specifies the MSCO option to the POS 110. In response to receipt of this instruction, the POS 110, generates and displays a coupling code that is used to couple a particular user computing device to that POS 110. The displayed code may be a one-off code that is generated for each transaction or otherwise used for only one transaction.

The mobile device 112 scans 410 the displayed coupling code. The mobile device 112 then transmits 412 the contents of the electronic cart to the POS 106a using the coupling code. This coupling code may be an address that can be used to transmit the contents of the electronic shopping cart directly to the POS 110. Alternatively, the contents of the cart with the coupling code may be transmitted with the coupling code to the global server system 102a or server system 102b. The server system 102a, 102b may then interpret the coupling code to identify the POS 110 that generated the coupling code and transmit the contents of the electronic shopping cart to this POS 110.

The contents of the electronic shopping cart received by the POS 110 may then be used to conclude 414 the transaction on the POS 110. The items received by the POS 110 may, for example, may treated in the same manner as items input to the POS 110 by scanning bar codes in the conventional manner. Likewise, concluding 414 the transaction may include receiving tender of cash, check, or electronic payment, as for the typical in-store transaction.

In some embodiments, the POS 110 may simply invoke printing of a paper receipt after concluding 414 the transaction. In some embodiments, the POS 110 may additionally or alternatively push 416 an electronic receipt to the mobile device 112. For example, the contents of the electronic shopping cart received by the POS 110 may be accompanied by a user identifier. This user identifier may then be used by the POS 110 to route an electronic receipt to the mobile device 112 and/or associated the electronic receipt with a user account associated with the user identifier. The mobile device 110, upon receiving the pushed electronic receipt, may one or both of store 418 the electronic receipt and display the receipt on the mobile device 110.

The method 800 is just one example of a use for data obtained according to methods described herein. In particular, the information obtained by scanning product information displayed in an optical code displayed by the in-store scanner 108 may be provided to an application that interacts with data or services provided by the global server system 102a in the same manner as product information retrieved from the server system 102a.

Figure 5:
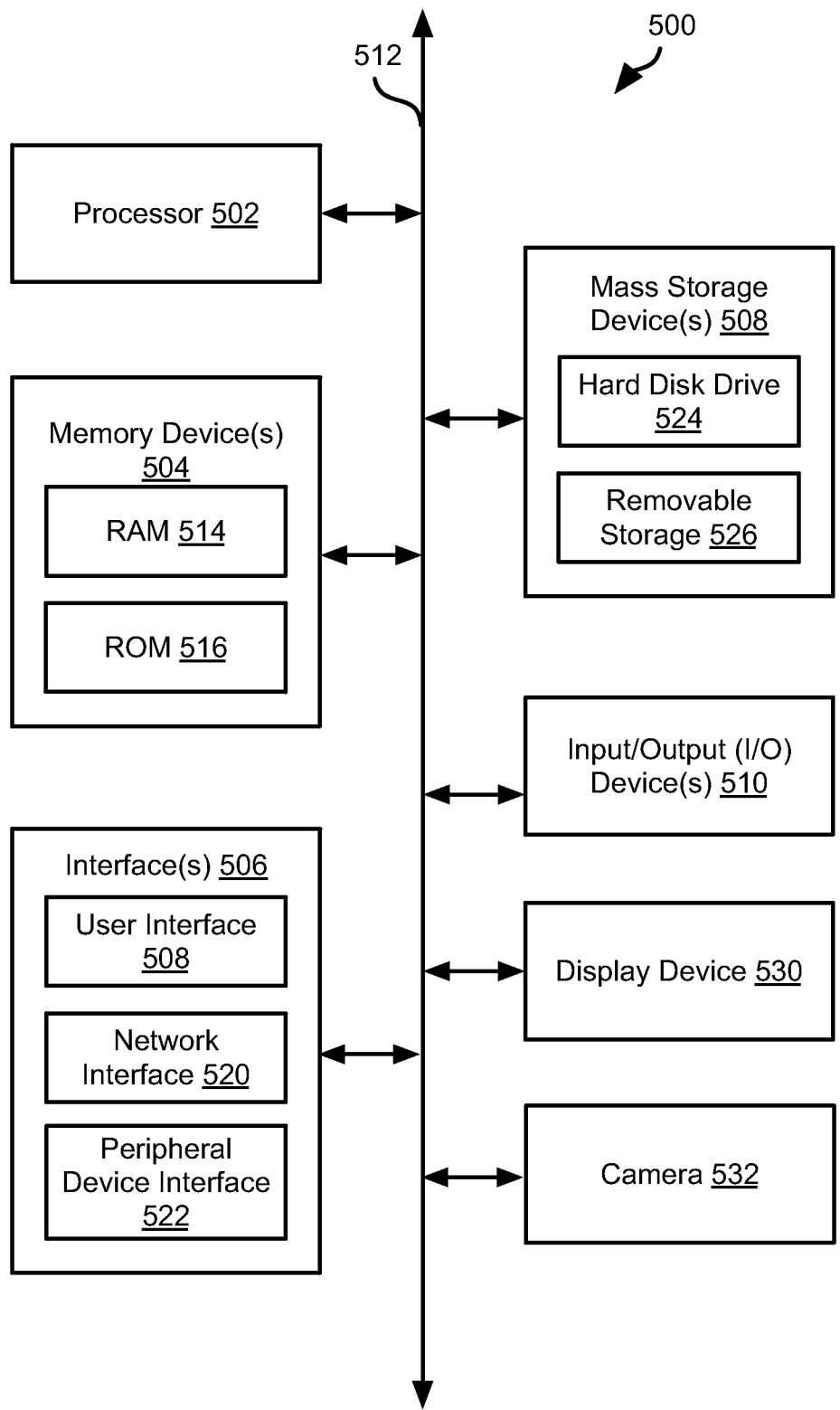
FIG. 5 is a schematic block diagram of a computer system suitable for implementing methods in accordance with embodiments of the present invention.

FIG. 5 is a block diagram illustrating an example computing device 500. Computing device 500 may be used to perform various procedures, such as those discussed herein. Computing device 500 can function as a server, a client, or any other computing entity, including any of the server systems 102a, 102b, POS 110, and user computing devices 112, 114. Computing device can perform various monitoring functions as discussed herein, and can execute one or more application programs, such as the application programs described herein. Computing device 500 can be any of a wide variety of computing devices, such as a desktop computer, a notebook computer, a server computer, a handheld computer, tablet computer and the like.

Computing device 500 includes one or more processor(s) 502, one or more memory device(s) 504, one or more interface(s) 506, one or more mass storage device(s) 508, one or more Input/Output (I/O) device(s) 510, a display device 530, and a camera 532 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   receiving, by a computer system, from a user device, a shopping list including a plurality of item identifiers;
   generating, by the computer system, a first route through a floor plan of a retail establishment, the first route visiting locations corresponding to the plurality of item identifiers of the shopping list in an order corresponding to a plurality of factors related to the item identifiers and the retail establishment;
   transmitting, by the computer system, the first route to the user device;
   receiving, by the computer system, from the user device, a scan of an optical code associated with an item identifier of the shopping list;
   determining, by the computer system. the location of the item associated with item identifier on the first route;
   determining, by the computer system, that the item is scanned out of an order corresponding to the first route
   and in response generating, by the computer system, a second route through the floor plan of the retail establishment, the second route starting at the location of the item and visiting locations corresponding to a portion of the plurality of item identifiers for which corresponding items have not been scanned in an order corresponding to the plurality of factors related to the remaining item identifiers and the retail establishment; and
   transmitting, by the computer system, the second route to the user device.

2. The method of claim 1, wherein the user device is a mobile device.

3. The method of claim 1, further comprising:
   receiving, by the computer system, notification of the scan of the optical code by the user device;
   in response to receiving notification of the scan of the optical code, transmitting, by the computer system, notification of the item identifier scanned by the user device to a sales device; and
   receiving, by the computer system, notification of purchase of an item corresponding to the item identifier.

4. The method of claim 1, further comprising:
   generating, by the computer system, directions between a plurality of locations corresponding to a plurality of contiguous item identifiers of the shopping list according to the first route;
   transmitting, by the computer system, the directions to the user device.

5. The method of claim 4, further comprising generating directions between the plurality of locations without any locational information from an electronic navigational system of the user device.

6. The method of claim 1, wherein generating the first and second routes comprises performing a route optimization algorithm.

7. A system comprising one or more processors and one or more memory devices operably coupled to the one or more processors, the one or more memory devices storing executable and operational code effective to cause the one or more processors to:
   receive from a user device, a shopping list including a plurality of item identifiers;
   generate a first route through a floor plan of a retail establishment, the first route visiting locations corresponding to the plurality of item identifiers of the shopping list in an order corresponding to a plurality of factors related to the item identifiers and the retail establishment;
   transmit the first route to the user device;
   receive from the user device, a scan of an optical code associated with an item identifier of the shopping list:
   determine the location of the item associated with item identifier on the first route;
   determine that the item is scanned out of an order corresponding to the first route.
   and in response generate a second route through the floor plan of the retail establishment, the second route starting at the location of the item and visiting locations corresponding to a portion of the plurality of item identifiers for which corresponding items have not been scanned in an order corresponding to the plurality of factors related to the remaining item identifiers and the retail establishment; and
   transmit the second route to the user device.

8. The system of claim 7, wherein the user device is a mobile device.

9. The system of claim 7, wherein the executable and operational data are further effective to cause the one or more processors to:
   receive notification of the scan of the optical code by the user device;
   in response to receiving notification of the scan of the optical code, transmit notification of the item identifier scanned by the user device to a sales device; and
   receive notification of purchase of an item corresponding to the item identifier.

10. The system of claim 7, wherein the executable and operational data are further effective to cause the one or more processors to:
    generate directions between a plurality of locations corresponding to a plurality of contiguous item identifiers of the shopping list according to the first route;
    transmit the directions to the user device.

11. The system of claim 10, wherein the executable and operational data are further effective to cause the one or more processors to generate directions between the a plurality of locations without any locational information from an electronic navigational system of the user device.

12. The system of claim 7, wherein the executable and operational data are further effective to cause the one or more processors to generate the first and second routes by performing a route optimization algorithm.

13. A system comprising one or more processors and one or more memory devices operably coupled to the one or more processors, the one or more memory devices storing executable and operational code effective to cause the one or more processors to:
    receive from a user device, a shopping list including a plurality of item identifiers;
    generate a first route through a floor plan of a retail establishment, the first route visiting locations corresponding to the plurality of item identifiers of the shopping list such that the locations of the plurality of item identifiers are visited in an initial ordering corresponding to a plurality of factors related to the item identifiers and the retail establishment;
    transmit the first route to the user device;
    select as a current item a first item identifier in the initial ordering;
    select as a current ordering of the item identifiers, the initial ordering and select as the current route, the first route;
    (a) present directions to the current item;
    (b) detect scanning of a scanned item by the user device by way of a scan of an optical code associated with an item identifier of the shopping list;

(c) (i) if the scanned item is the current item, (1) determining a next item in the current ordering following the current item, (2) setting as the current item the next item, and repeating (a) through (c);

(ii) if the scanned item is not the current item, (1) determine a location of the scanned item, (2) generate an updated route starting at the location of the scanned item and visiting, according to an updated ordering, locations corresponding to item identifiers of the shopping list for which an item has not been scanned, (3) setting as the current ordering the updated ordering and as the current route the updated route, and (4) repeating (a) through (c).

14. The system of claim 13, wherein the user device is a mobile device.

15. The system of claim 13, wherein the executable and operational data are further effective to cause the one or more processors to:
receive notification of the scan of the optical code by the user device;
in response to receiving notification of the scan of the optical code, transmit notification of the item identifier scanned by the user device to a sales device; and
receive notification of purchase of an item corresponding to the item identifier.

16. The system of claim 13, wherein the executable and operational data are further effective to cause the one or snore processors to generate the initial and updated routes by performing a route optimization algorithm.

* * * * *